US012705145B2

(12) United States Patent
Pearson

(10) Patent No.: US 12,705,145 B2
(45) Date of Patent: Aug. 11, 2026

(54) HIGH-BANDWIDTH MODULAR SLIP RING WITH EMBEDDED ERROR CORRECTION

(71) Applicant: Moog Inc., East Aurora, NY (US)

(72) Inventor: Phil E. Pearson, Hartland, WI (US)

(73) Assignee: Moog Inc., East Aurora, NY (US)

( * ) Notice: Subject to any disclaimer, the term of this patent is extended or adjusted under 35 U.S.C. 154(b) by 135 days.

(21) Appl. No.: 18/724,937

(22) PCT Filed: Dec. 30, 2022

(86) PCT No.: PCT/US2022/054404
§ 371 (c)(1),
(2) Date: Jun. 27, 2024

(87) PCT Pub. No.: WO2023/129751
PCT Pub. Date: Jul. 6, 2023

(65) Prior Publication Data

US 2025/0068510 A1 Feb. 27, 2025

Related U.S. Application Data

(60) Provisional application No. 63/295,753, filed on Dec. 31, 2021.

(51) Int. Cl.
*G06F 11/16* (2006.01)
*G02B 6/36* (2006.01)

(52) U.S. Cl.
CPC ............ *G06F 11/16* (2013.01); *G02B 6/3604* (2013.01)

(58) Field of Classification Search
CPC .............................. G06F 11/16; G02B 6/3604
See application file for complete search history.

(56) References Cited

U.S. PATENT DOCUMENTS 4,109,998 A * 8/1978 Iverson .................. H04B 10/25 250/208.6
4,708,024 A * 11/1987 Hojo ...................... G01C 19/38 33/327
4,796,183 A 1/1989 Ermert et al.
(Continued)

FOREIGN PATENT DOCUMENTS

EP 0993666 B1 9/2002
EP 2 932 901 B1 10/2016
EP 3252912 A1 12/2017

OTHER PUBLICATIONS

Douarville-Blaise et al. (2017) “Eliminate Crosstalk Using Symmetry in MIMO Arrays of Inductive Antennas: An Introduction to Pie-Chart Antennas,” Progress In Electromagnetics Research B, vol. 75: 149-173.

*Primary Examiner* — Joseph D Torres
(74) *Attorney, Agent, or Firm* — Harter Secrest & Emery LLP

(57) ABSTRACT

A non-contacting rotary joint for transmitting and receiving electrical signals, including a transmitter having a plurality of emitters positioned in a substantially annular pattern, wherein the plurality of emitters are operable to transmit a signal; a receiver located a distance from the transmitter, wherein the receiver includes a plurality of cells operable to receive the signal across a non-contacting interface; and a signal source in communication with the transmitter; wherein the plurality of emitters form a plurality of data channels less than the number of emitters.

14 Claims, 10 Drawing Sheets

(56) References Cited

U.S. PATENT DOCUMENTS

| | | | | |
|---|---|---|---|---|
| 4,943,137 | A | 7/1990 | Speer | |
| 5,018,174 | A | 5/1991 | Collins | |
| 5,208,581 | A | 5/1993 | Collins | |
| 5,336,897 | A | 8/1994 | Watanabe et al. | |
| 5,354,993 | A | 10/1994 | Kedmi et al. | |
| 5,991,478 | A | 11/1999 | Lewis et al. | |
| 6,104,849 | A | 8/2000 | Lewis et al. | |
| 6,128,426 | A | 10/2000 | Einhorn | |
| 6,292,919 | B1 * | 9/2001 | Fries | A61B 6/56 714/746 |
| 6,327,327 | B1 * | 12/2001 | Herold | A61B 6/56 378/194 |
| 6,385,367 | B1 | 5/2002 | Rogers et al. | |
| 6,453,088 | B1 | 9/2002 | Lewis et al. | |
| 6,907,161 | B2 * | 6/2005 | Bowman | G02B 6/3604 385/25 |
| 6,950,633 | B2 | 9/2005 | Kojima et al. | |
| 6,980,714 | B2 | 12/2005 | Lo et al. | |
| 7,339,302 | B2 * | 3/2008 | Lewis | H01R 39/381 310/238 |
| 7,461,798 | B1 * | 12/2008 | Malsam | A01G 25/092 239/66 |
| 7,755,055 | B2 | 7/2010 | Schilling | |
| 8,167,623 | B2 * | 5/2012 | Schlichtherle | H01R 39/64 310/248 |
| 8,295,431 | B2 | 10/2012 | Lindorfer | |
| 8,487,625 | B2 | 7/2013 | Fang et al. | |
| 8,594,480 | B2 | 11/2013 | Krumme et al. | |
| 8,628,092 | B2 * | 1/2014 | Deo | F01D 11/12 277/412 |
| 8,772,985 | B2 | 7/2014 | Lohr | |
| 8,779,928 | B2 * | 7/2014 | Ganesh | G01R 31/343 340/650 |
| 9,608,395 | B2 | 3/2017 | Overweg et al. | |
| 11,056,849 | B2 * | 7/2021 | Sixt | H01R 43/14 |
| 2002/0003450 | A1 | 1/2002 | Pearson, Jr. et al. | |
| 2002/0132589 | A1 | 9/2002 | Kojima et al. | |
| 2004/0008720 | A1 * | 1/2004 | Wang | H04L 12/422 370/460 |
| 2004/0141686 | A1 | 7/2004 | Schilling et al. | |
| 2012/0237101 | A1 * | 9/2012 | Kaempfer | A61B 6/032 382/131 |
| 2012/0280115 | A1 | 11/2012 | Lo et al. | |
| 2013/0301890 | A1 | 11/2013 | Kaempfer | |
| 2015/0156494 | A1 | 6/2015 | Chandra | |
| 2016/0127052 | A1 | 5/2016 | Steffens | |
| 2016/0336630 | A1 | 11/2016 | Coleman | |
| 2016/0380728 | A1 | 12/2016 | Dudek et al. | |
| 2017/0170876 | A1 | 6/2017 | Weaver et al. | |
| 2018/0003845 | A1 | 1/2018 | Sakiyama et al. | |
| 2018/0031771 | A1 | 2/2018 | Rollinger et al. | |

* cited by examiner 100
102
126A
High Speed Serial Channel 1
High Speed Serial Channel 2
RS 232 Channel 1
RS 422 Channel 2
RS 232/422 Tx (1 bit)
1
Run-Length FEC
32 bit single/double bit detect
Single bit correct (Optional)
CDR
SERDES
148
High-Speed Serial Data
10101010
00110100
1010101010101010101010101010101000110100
10101010101010101010101010101010001101001010101010101010101010101010101000110100
Shift Position Command
134A
134B
110
140
132
114
FEC Computation
FEC Status
CDR-PLL Clock Recovery
112

HIGH-BANDWIDTH MODULAR SLIP RING WITH EMBEDDED ERROR CORRECTION

TECHNICAL FIELD

The present disclosure relates generally to a slip ring, and more particularly to a slip ring operable to transmit a signal across a non-contacting interface.

BACKGROUND

Devices for conducting electrical signals between two relatively rotatable members are known in the art. Such devices, generically known as rotary joints or rotary electrical interfaces, include, inter alia, slip rings and twist capsules. Slip rings are typically used when unlimited rotation between the two relatively rotatable members is required, while twist capsules are typically used when only limited rotation between the two relatively rotatable members is required.

A slip ring is an electromechanical device that enables the transmission of electrical power and signals between a stationary structure and a rotating structure. A slip ring can be used in any electromechanical system that requires rotation while transmitting electrical power and/or signals. A slip ring can also improve mechanical performance, simplify system operation, and eliminate damage-prone wires dangling from movable joints. Traditionally, slip ring designs only conveyed data over a very small portion of the slip ring area.

Conventional slip rings typically employ sliding electrical contacts between the two relatively rotatable members. These slip rings with sliding electrical contacts have inherent weaknesses that constrain electrical performance at higher frequencies. Non-contacting slip rings are also known in the art. These non-contacting rotary joint systems enable the transmission of high-frequency electrical signals between a rotor and a stator without sliding electrical contacts. Such non-contacting rotary joint systems include devices operable to recover electromagnetic energy transmitted across space between a signal source and a signal receiver. In radio frequency ("RF") communications systems, such devices are called antennas (or antennae), and typically operate in the classical far-field electromagnetic radiation of free space.

Conventional devices are limited in their data transfer rate capability, utilizing only a small portion of slip ring area. The present disclosure provides for a slip ring having an increased aggregate data transfer rate.

SUMMARY

The present disclosure provides a non-contacting rotary joint configured to simultaneously transfer data on one or more data channels across substantially the entire circumference of the rotary joint.

In an exemplary embodiment, a non-contacting rotary joint (100) for transmitting and receiving electrical signals includes a transmitter (102) having a plurality of emitters (110) positioned in a substantially annular pattern, wherein the plurality of emitters are operable to transmit a signal, and a receiver (112) located a distance from the transmitter, wherein the receiver includes a plurality of cells (114) operable to receive the signal across a non-contacting interface. The non-contacting rotary joint further includes a signal source (104) in communication with the transmitter, wherein the plurality of emitters form a plurality of data channels (126) less than the plurality of emitters.

In another exemplary embodiment, a slip ring for transmitting and receiving data includes a rotating part having a longitudinal axis and a plurality of emitters positioned around the longitudinal axis of the rotating part, the plurality of emitters being positioned in a continuous ring formation and configured to transmit data; and a stationary part having a plurality of receivers positioned around the longitudinal axis and adjacent to the plurality of emitters of the rotating part, the plurality of receivers being configured to receive the transmitted data from the plurality of emitters of the rotating part, each receiver of the plurality of receivers being associated with a data channel, each data channel being associated with a cell, the cells being configured to be active cells or inactive cells, the active cells and the inactive cells being positioned in an alternating order.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1:
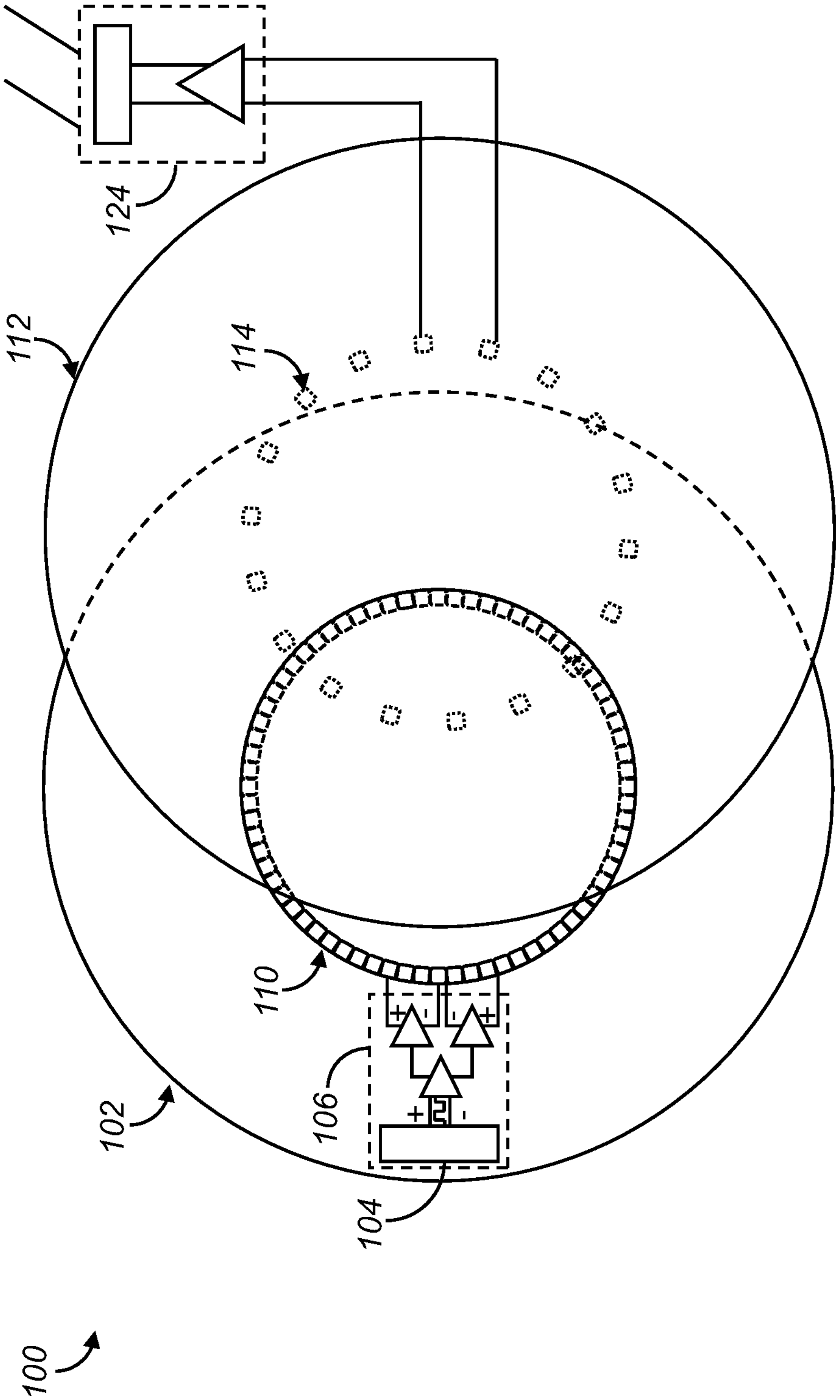
FIG. 1 is a schematic diagram of a slip ring having a rotating part and a stationary part in accordance with an exemplary embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

One skilled in the relevant art will recognize that the elements and techniques described herein can be practiced without one or more of the specific details, or with other methods, components, materials, etc. In some instances, well-known structures, materials, or operations are not shown or described in detail to avoid obscuring certain aspects of the present disclosure. Reference throughout the specification to "one embodiment", "an embodiment", or "an example embodiment" means that a particular feature, structure, or characteristic described in connection with the embodiment is included in at least one embodiment of the present disclosure. Thus, the appearance of the phrase "in one embodiment" or "in an embodiment" throughout the specification is not necessarily referring to the same embodiment. However, the particular features, structures, or characteristics described may be combined in any suitable manner in one or more embodiments.

Where they are used herein, the terms "first", "second", and so on, do not necessarily denote any ordinal, sequential, or priority relation, but are simply used to more clearly distinguish one element or set of elements from another, unless specified otherwise.

Where used herein, the term "coupled", in the context of optics, refers to a path by which light travels from one optical medium or device to another optical medium or device.

Where used herein, the term "about" when applied to a value is intended to mean within the tolerance range of the equipment used to produce the value, or, in some examples, is intended to mean plus or minus 10%, or plus or minus 5%, or plus or minus 1%, unless otherwise expressly specified.

Where used herein, the term "substantially" is intended to mean within the tolerance range of the equipment used to produce the value, or, in some examples, is intended to mean plus or minus 10%, or plus or minus 5%, or plus or minus 1%, unless otherwise expressly specified.

Embodiments of a slip ring and the systems made therewith are described herein. Slip rings may be utilized with any rotating object to transfer analog or digital signals including data. Slip rings have applications in, but are not limited to use with, computed tomography (CT) scanners, luggage scanners, forward looking infrared (FLIR) systems, flight controls, amusement rides, cranes, offshore mooring, non-destructive test equipment, and industrial 3D imaging equipment.

Referring now to the drawings, FIG. 1 shows a simplified schematic of a slip ring 100 according to an exemplary embodiment. The slip ring 100 is a non-contacting rotary joint operable to transmit high-speed data signals across an interface between two relatively movable members without the use of sliding electrical contacts in the signal path. As illustrated in FIGS. 1-7, in an embodiment, the slip ring 100 may be implemented with printed circuit board ("PCB") technology, and may support multi-gigabit data transmission rates, with frequency-domain bandwidths. The slip ring 100 may be a platter-type slip ring. In other embodiments, the slip ring 100, 200 comprises printed circuit board (PCB) segments. In yet another embodiment, the slip ring 100, 200 may be a drum-type.

The slip ring 100 includes a transmitter 102. In an embodiment, the transmitter 102 is a circular platter PCB transmitter. A signal source 104 is operable to deliver a high-speed digital data signal to a plurality of emitters 110. In an embodiment, the emitters 110 form a continuous ring of discrete transmitters. For example, the continuous ring of transmitters 110 may be electronically split into a plurality of channels. The signal then propagates across a gap (e.g., an air gap) to a plurality of receivers 114. The signal transmitted by the emitters 110 is sampled by the plurality of adjacent discrete receivers 114 coupled with a slip ring receiver 112. In an embodiment, the slip ring receiver 112 is a circular platter printed circuit board suspended at a predetermined distance over the transmitter 102 to allow free rotation of the slip ring 100 without physical contact. Thus, the plurality of receivers 114 are suspended at a distance over the emitters 110. A signal recovered across the air gap by the receivers 114 is delivered to receiver electronics 124 of the slip ring receiver 112. At the receiver electronics 124 the signal can be detected, amplified, and the signal data recovered. FIG. 1 shows only portions of the transmitter 102 and receiver 112, wherein the receiver 112 is offset from the transmitter 102, for the purpose of clarity.

In an embodiment, the transmitter 102 is a rotating part including a rotor, and the receiver 112 is a non-rotating part including a stator. In another embodiment, the transmitter 102 is a non-rotating part and the receiver 112 is a rotating part. The location of the emitters 110 and the receivers 114 may depend, at least in part, on the application of the slip ring 100. The plurality of receivers 114 comprise data channels 126B to facilitate the transfer of data in the slip ring 100. In an embodiment, the emitters 110 define thirty-two active communication channels 126A, and the receivers 114 comprise thirty-two corresponding data channels 126B.

Emitters and Receivers

As illustrated in FIGS. 2A-5, in an embodiment, the slip ring transmitter 102 includes one hundred and twenty-eight (128) of the emitters 110 located in an annular configuration. The emitters 110 may be, but are not limited to, light emitting diodes (LEDs), microLEDs, capacitive emitter cells, inductive emitter cells, ultrasonic emitter cells, and radio frequency (RF) emitter cells. In an embodiment, the LED emitters 110 are coupled with the transmitter 102 in a circle, but it is envisioned that the LED emitters 110 may be positioned about the transmitter 102 in any shape or form that is suitable for data transmission.

Figure 3B:
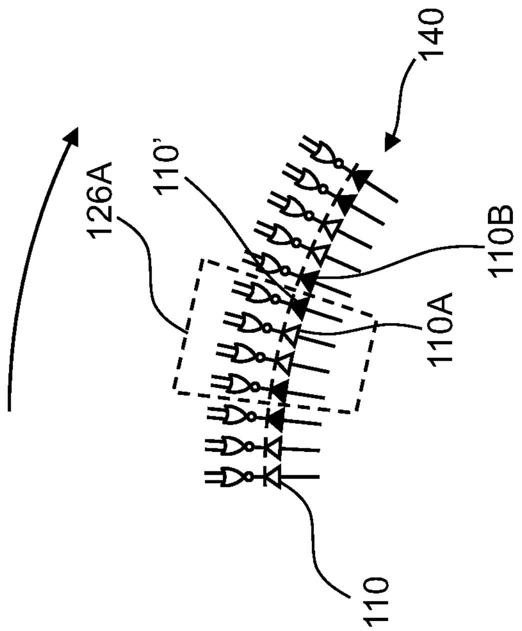
FIGS. 3A and 3B are schematic diagrams of data channels having emitters in an ON and OFF state in accordance with an exemplary embodiment of the present disclosure.
Figure 3A:
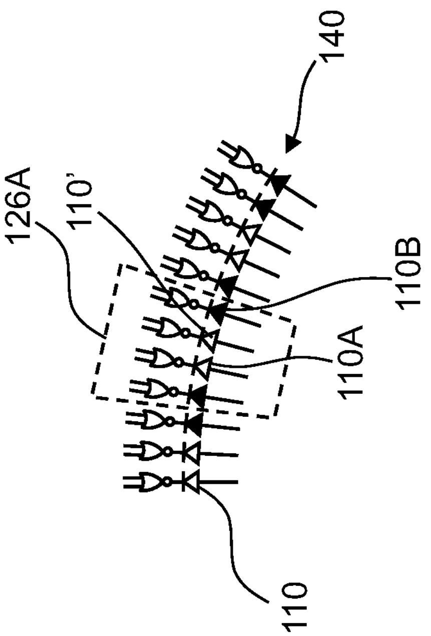
Figure 4:
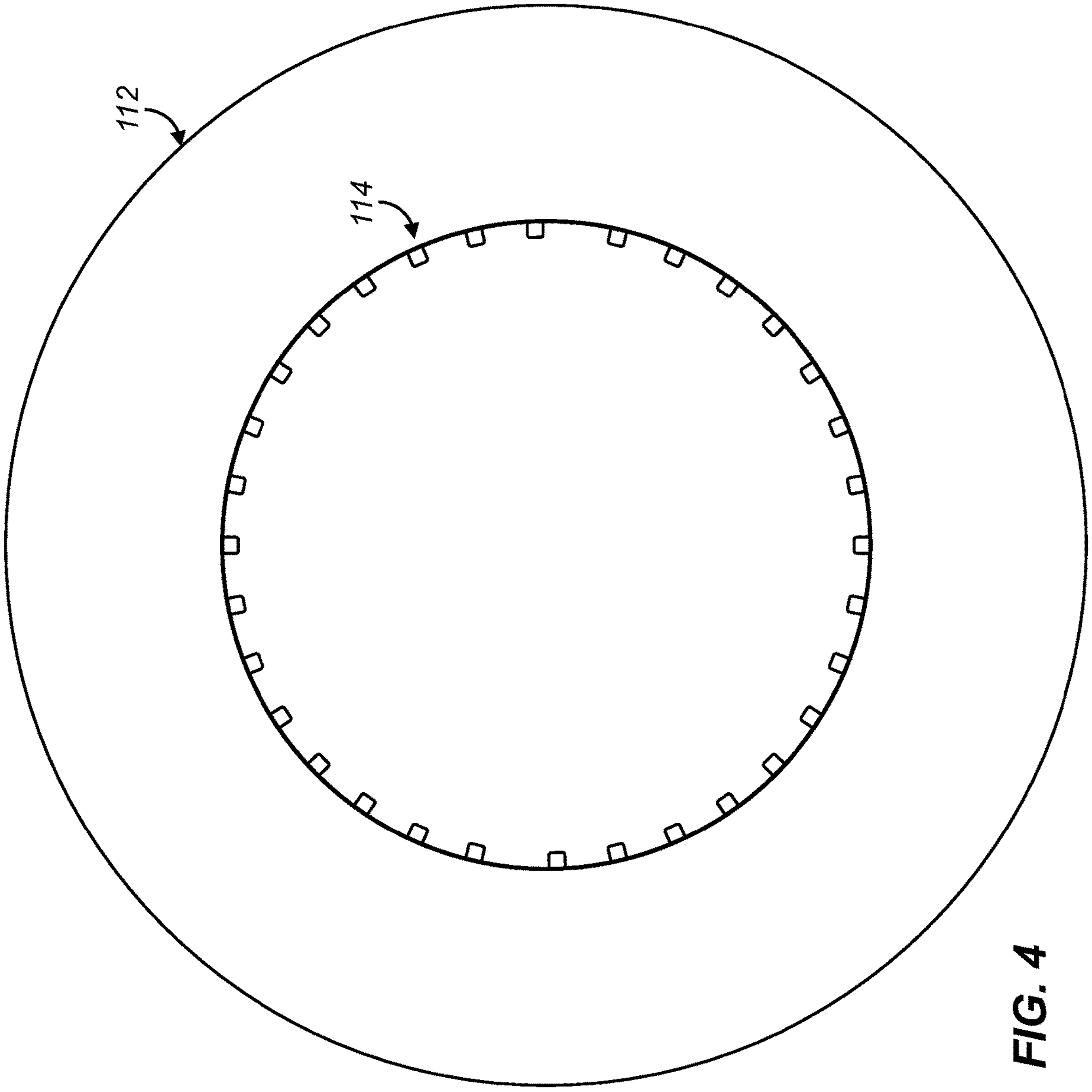
FIG. 4 is a top plan view of a slip ring receiver in accordance with an exemplary embodiment of the present disclosure.

In an example embodiment, the emitters 110 form a plurality of data channels 126A. As shown in FIGS. 3A-3B, in an embodiment, four emitters 110 form a data channel 126A. In each data channel 126A, the two circumferentially inner emitters 110A are active (ON), while each of the circumferentially outer emitters 110B are inactive (OFF). In an embodiment, the four emitters 110 forming each data channel 126A are operable such that the emitters 110 form an alternating pattern of two ON emitters 110A and two OFF emitters 110B. In FIGS. 3A-3B, the active emitters 110A are shown as white and the inactive emitters 110B are shown as black. In an embodiment having a ring of one hundred and twenty-eight emitters 110, the slip ring transmitter 102 comprises thirty-two data channels 126A. Utilizing intentionally inactive emitter cells 110B in each data channel 126A militates against adjacent signal crosstalk. In other embodiments, the active emitter cells 110A and the inactive emitter cells 110B may alternate in order by single emitter cells 110 or groups of emitter cells 110.

In an embodiment, when the slip ring transmitter 102 is rotated, steering electronics are utilized to translate and electronically rotate the active data channel emitters 110A in a manner that maintains the alignment of the data channels 126A with the multiple (e.g., thirty-two) discrete stationary receivers 114 of the data channels 126B. The plurality of receivers 114 may be, but are not limited to, LED receiver cells, microLED receiver cells, photodiodes, capacitive receiver cells, inductive receiver cells, ultrasonic receiver cells, and radio frequency (RF) receiver cells. For example, as shown in FIG. 3B, where the slip ring transmitter 102 is rotated 1/128 of a mechanical rotation in a clockwise direction, an emitter 110', which was active before the 1/128 rotation, becomes inactive after the 1/128 rotation to maintain each data channel 126A in a static position relative to the stationary receivers 114 and the data channels 126B. This design provides one active emitter 110A in each data channel 126A at all times during rotation.

Figure 2A:
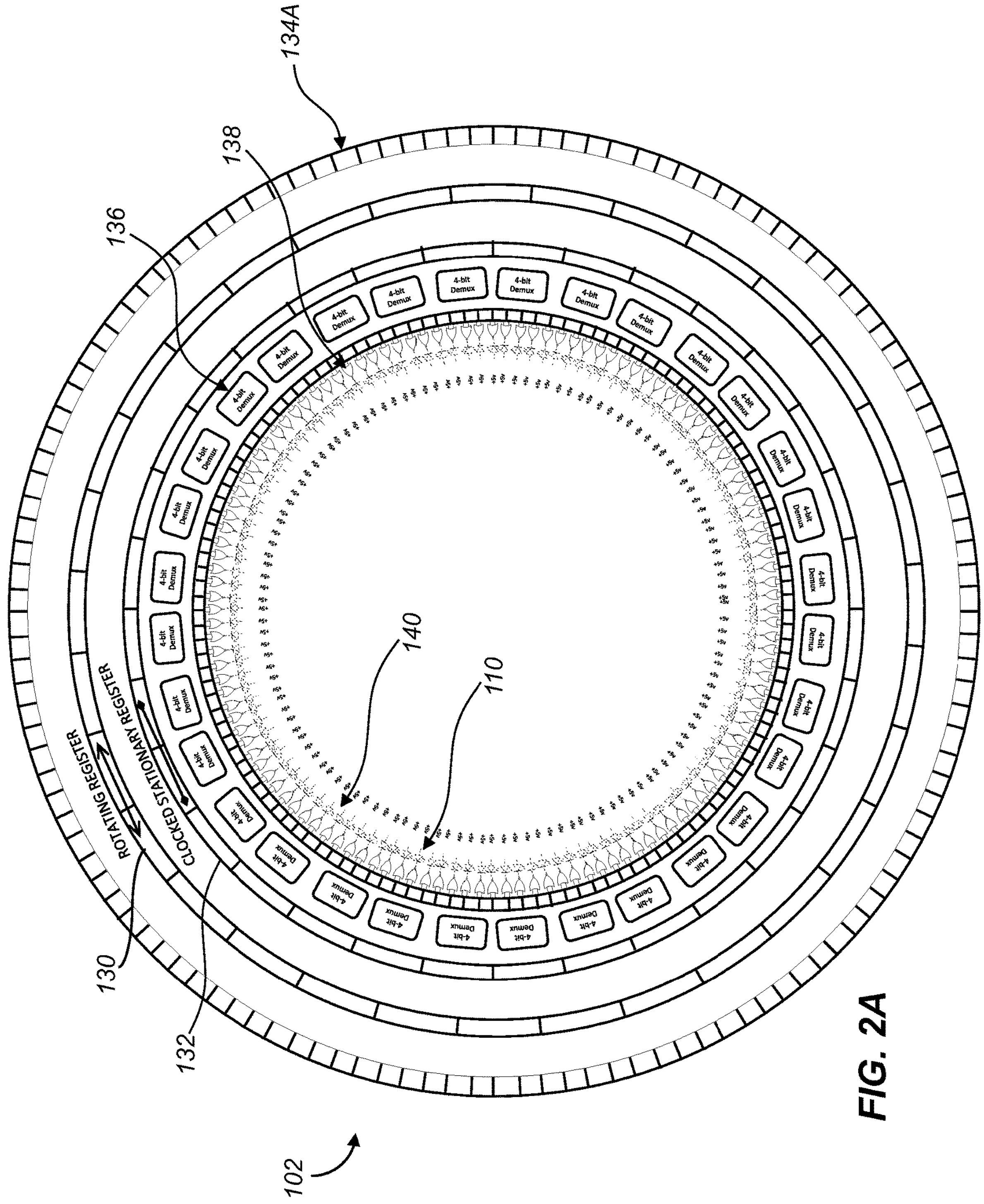
FIG. 2A is a schematic top plan view of a slip ring transmitter in accordance with an exemplary embodiment of the present disclosure.
Figure 2B:
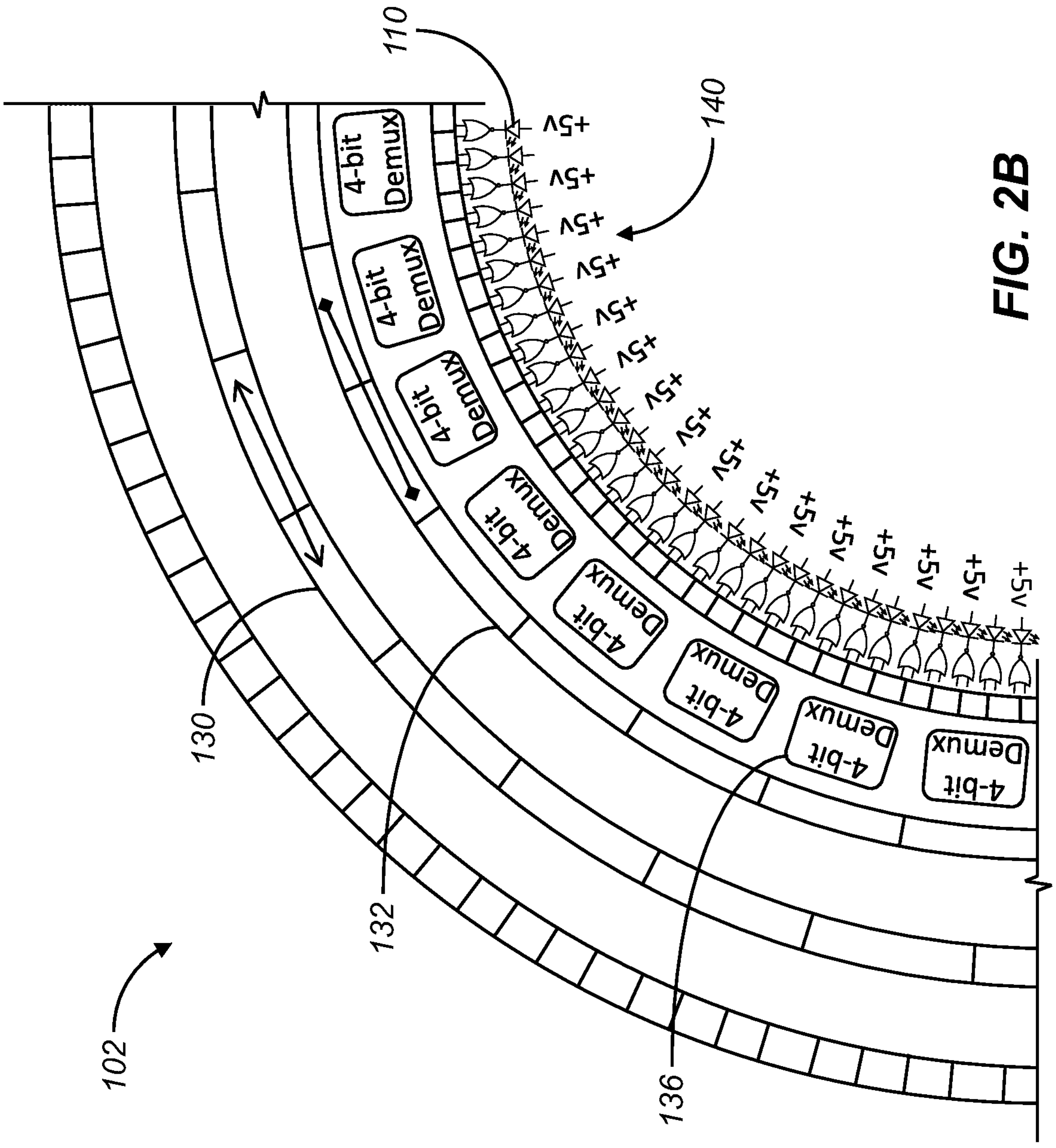
FIG. 2B is a schematic top plan view of a portion of the slip ring transmitter according to FIG. 2A.
Figure 5:
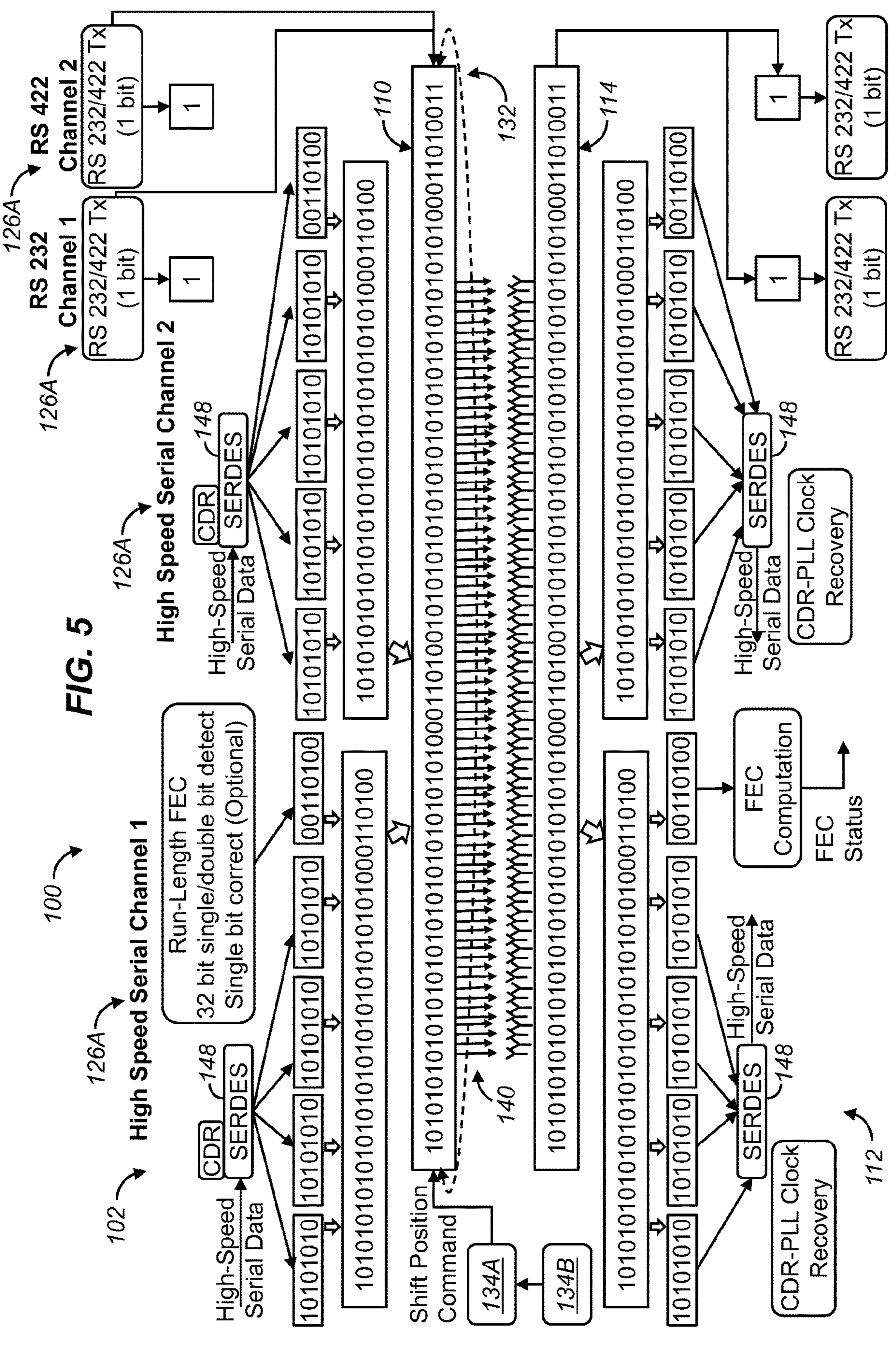
FIG. 5 is a flow chart of operations of the slip ring in accordance with an exemplary embodiment of the present disclosure.
Figure 6:
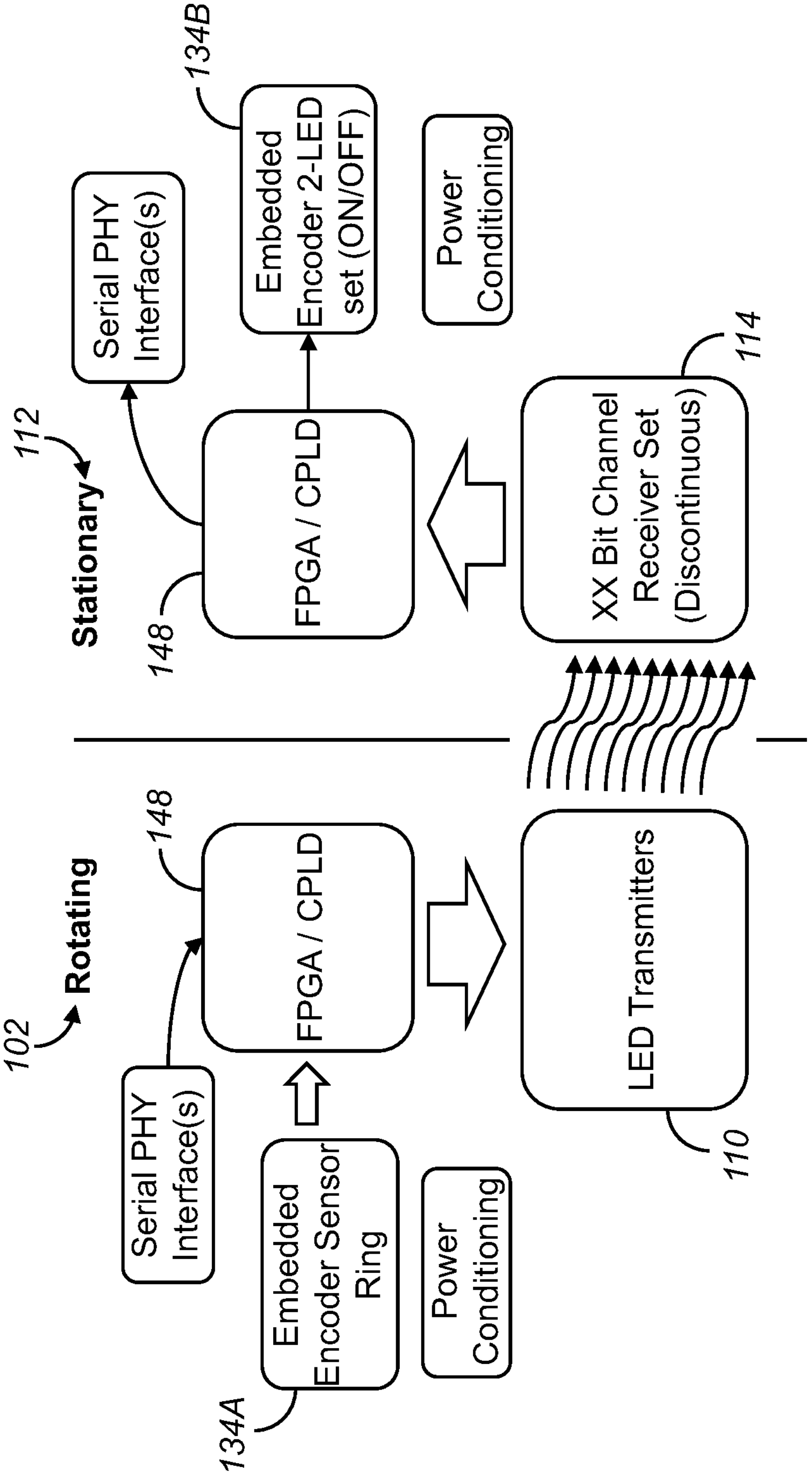
FIG. 6 is a block diagram for a small slip ring in accordance with an exemplary embodiment of the present disclosure.

In an embodiment, as shown schematically in FIGS. 2A and 2B, the steering electronics utilized to maintain the relative position of the data channels 126A, 126B include a rotating register 130, a clocked stationary register 132, and an encoder position sensor ring 134A, 134B. As illustrated in FIGS. 5 and 6, in an embodiment, the rotating register 130 and the clocked stationary register 132 are provided in an integrated circuit including Field-Programmable Gate Arrays (FPGAs) 148 and/or in a serializer/deserializer (SERDES) of the FPGAs 148. In an embodiment, in operation, data bits are parallel-loaded into the rotating register 130 and concatenated from multiple bytes received from the SERDES. The data bits are then transferred from the rotating register 130 through the stationary shift register 132, where the data bits are "clocked" based on commands from the encoder position sensor ring 134A, 134B. In an example embodiment, the shift register 132 is a parallel-serial bi-directional wrapping shift register with priority arbiter. The slip ring 100 includes four-bit demultiplexers 136 which are then operable to output one of four bit positions congruent with the two least significant bits (LSB) of the encoder position sensor ring 134A, 134B. Next, FPGA "OR" gates 138 utilize the encoded bit positions to determine which two emitters 110 to activate for each bit in order to maintain the relative position of the data channels 126A, 126B. With every clock pulse, the active emitters 110 are shifted one position to either the right or left, depending on the direction of rotation.

The FPGA 148 is operable to manage adjacent data transfer (e.g., signal crosstalk) between the plurality of emitters 110 and the plurality of receivers 114. The FPGA 148 allows for high-density, high-speed logic switching for the plurality of data channels 126.

In an embodiment, an aggregate data transmission rate of the slip ring 100 is determined by a switch (ON/OFF) time of the emitters 110, receiver 114 bandwidth, and the total number of data channels 126A, 126B. The data transmission rates achievable are a function of available data transfer surface area. Data transfer occurs simultaneously across each (e.g., thirty-two) data channel 126A, 126B of the slip ring 100. For example, the plurality of emitters 110 transmit data across the entire circumference of the ring formed by the emitter 110 on the transmitter 102. On certain slip ring designs, as discussed later herein, error-corrected bandwidth on a single data channel stripe 140 exceeds 20 Gbps. In an embodiment, a slip ring 100 design includes multiple concentric data channel stripes 140.

In an embodiment wherein the emitters 110 comprise LED's (i.e., an optical transfer medium), the slip ring 100 is operable to utilize spectral channel differentiation to increase the number of data channels 126 and thereby increase the aggregate data transmission rate. In an embodiment, the slip ring transmitter 102 includes a ring of LED emitters 110 operable to emit light in at least two different wavelength ranges. For example, the LED emitters 110 may be operable to emit infrared light (generally having a wavelength in the range of 700 nanometers to 1 millimeter) and green light (generally having a wavelength in the range of 560 to 520 nanometers). Spectral filtering may also be utilized to ensure separation of the data channels 126. In this way, a data channel 126A may comprise two adjacent LED emitters 110, such that every two emitters 110 alternate the wavelength at which light is emitted. In an embodiment having one hundred and twenty-eight emitters 110, the slip ring 102 may comprise sixty-four data channels 126. Spectral channel differentiation may be employed in uni-directional and bi-directional data transmission applications.

Similar to spectral channel differentiation, the slip ring 102 may utilize RF, capacitive, or inductive techniques and employ RF filtering techniques and information modulation techniques to further increase the bit rate per channel of the plurality of data channels 126 for a particular bandwidth.

In an embodiment, the slip ring 100 includes a plurality of communication pipes divided on the aggregate data channel 126 bandwidth of a single data stripe 140 or a plurality of data stripes 140. This may be accomplished with a data configurator circuit board 152. For example, the slip ring 100 may include at least two RS232/422 serial channels 126 in addition to two 10 Gbps serial channels 126 on a single data stripe 140. In an example embodiment, a single data stripe 140 may include eighty-two individual LED channels or antenna patch (RF) parallel bit transmissions aligned to the stator 112. The plurality of data channels 126 of the slip ring 100 are protocol agnostic and may be used for Ethernet transfer protocols (10/100/1G/10G), USB protocols, and SMPTE (3G, 6G, 12G SDI, 292M, 424M).

Modular and Large Slip Rings

Figure 7:
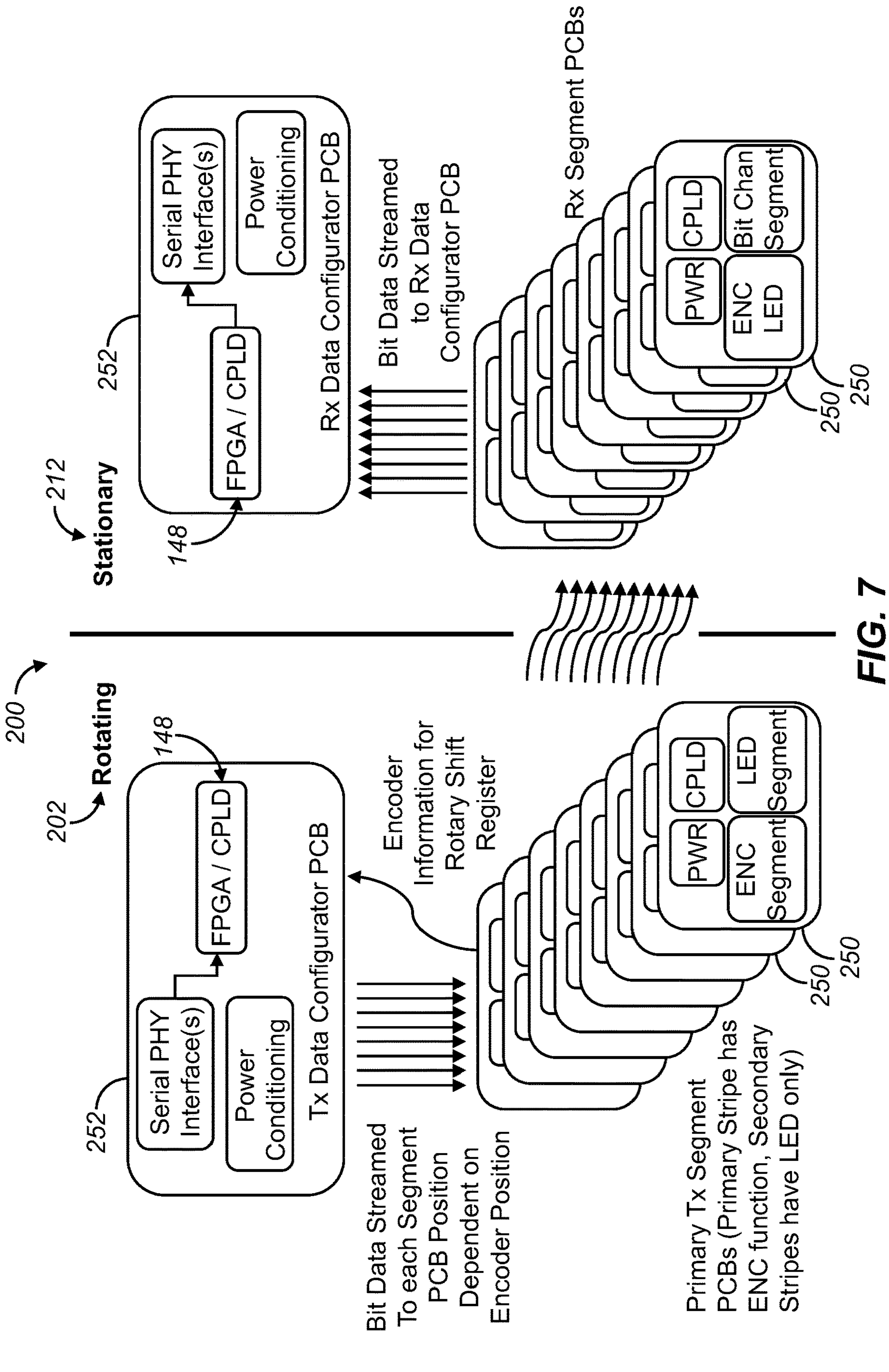
FIG. 7 is a block diagram for a large slip ring in accordance with an exemplary embodiment of the present disclosure.
Figure 8A:
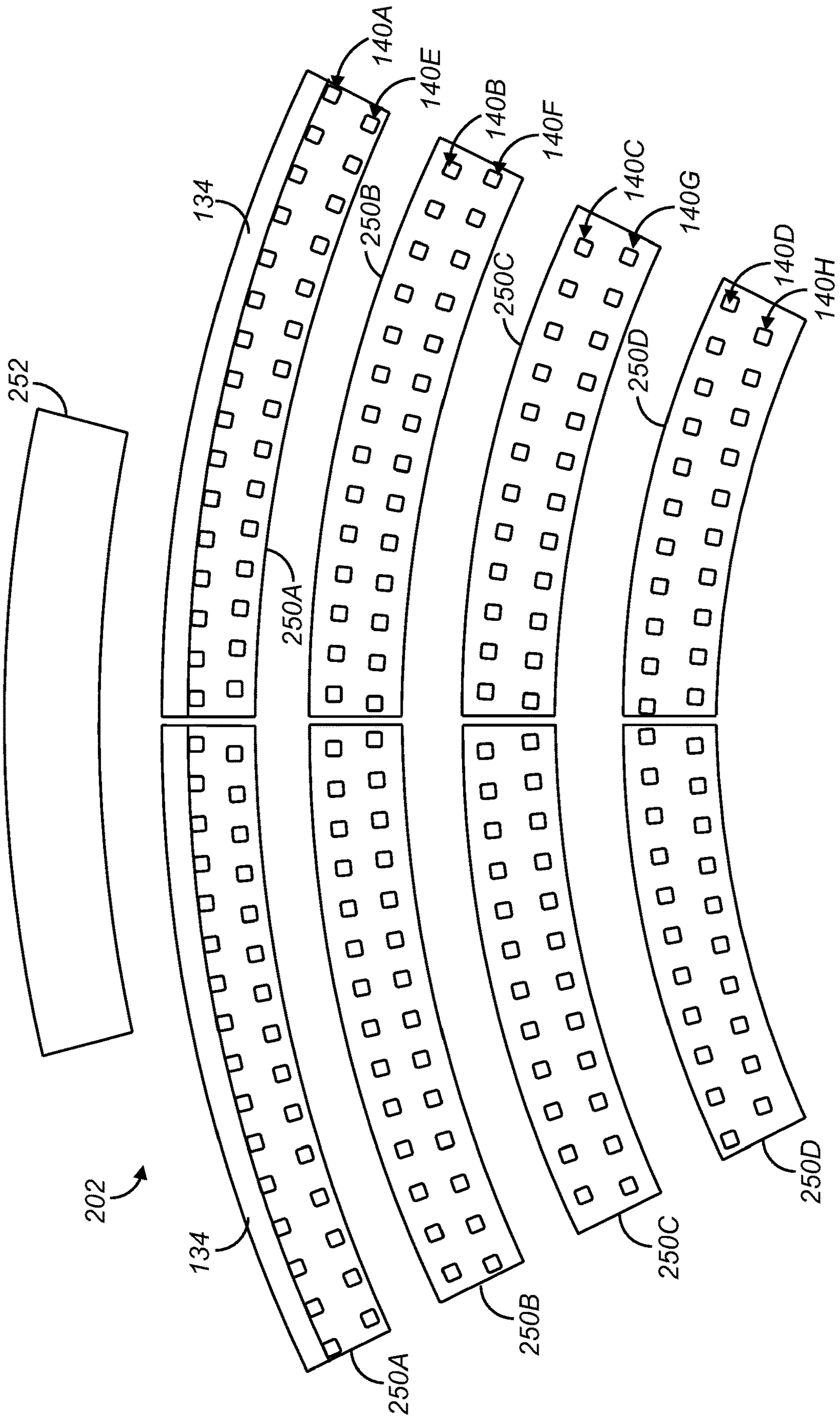
FIG. 8A is a top plan view of a portion of a slip ring transmitter in accordance with an exemplary embodiment of the present disclosure.
Figure 8B:
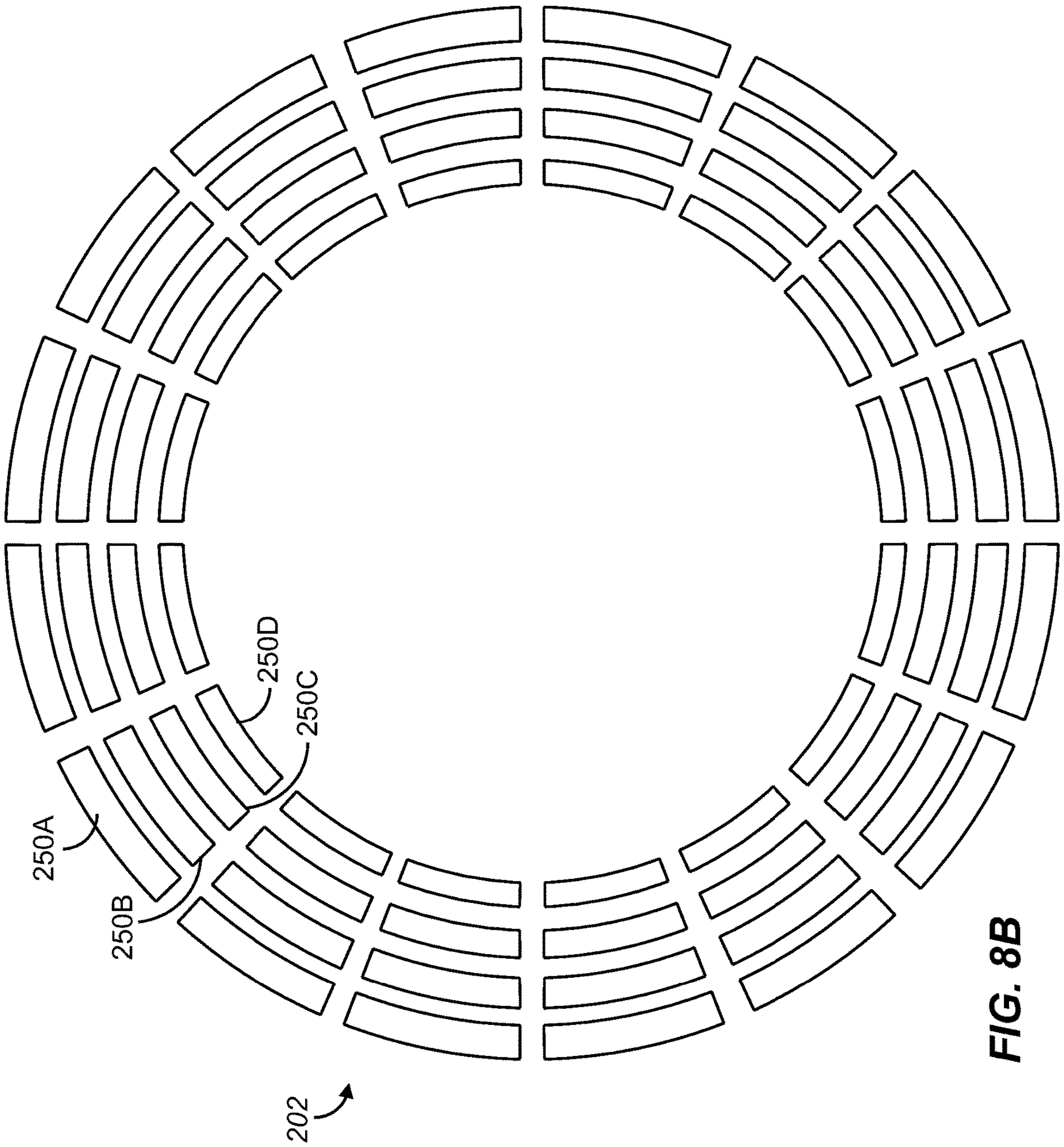
FIG. 8B is a top plan view of a portion of a slip ring transmitter in accordance with an exemplary embodiment of the present disclosure.

Referring now to FIGS. 7 and 8A-8B, in an embodiment, a slip ring 200 includes a modular architecture. The discrete nature of the plurality of data channels 126 formed by the plurality of emitters 110 and receivers 114 enables a large slip ring to be formed utilizing a slip ring transmitter 202 and/or a slip ring receiver 212 having discrete modular PCB sections 250. Having a plurality of data channels 126 facilitates a slower data transmission rate per data channel 126 and reduces the need for clock-skew corrections away from the signal source 104. The embedded encoder position sensor ring 134A, 134B can also be sectioned with the PCB sections 250. The embedded encoder 134A, 134B may be constructed using PCB components, with a required resolution equal to or better than the angle subtended by a single emitter cell 110. In an embodiment, a mounting space of approximately 1-2 mm is utilized between the PCB sections 250 with a nominal read-head distance of 3-4 mm.

In an embodiment, replacement PCB sections 250 are operable to connect with other PCB sections 250 via mechanical connectors (e.g., "snap" connectors) located on the back-side of the PCB sections 250. The PCB section connectors provide alignment locators such that PCB sections 250 can be individually replaced without any re-alignments required. In an embodiment, the slip ring 200 is manufactured as a single instantiation onto a ring set.

As illustrated in FIGS. 7 and 8A-8B, in an embodiment, the slip ring 200 includes a slip ring transmitter 202 having a plurality of PCB sections 250A. The PCB sections 250A include a first data stripe 140A. The PCB sections 250A are located generally about the periphery of the slip ring transmitter 202 and each include a plurality of emitters 110 and encoder sensors 134A, 134B. The PCB sections 250A may be referred to herein as the primary transmission PCB's. The slip ring transmitter 202 also includes a plurality of PCB sections 250B located radially inward of the PCB sections 250A. The PCB sections 250B comprise a second data stripe 140B including a plurality of emitters 110. The slip ring transmitter 202 also includes a plurality of PCB sections 250C located radially inward of the PCB sections 250B. The PCB sections 250C comprise a third data stripe 140C including a plurality of emitters 110. The slip ring transmitter 202 further includes a plurality of PCB sections 250D located radially inward of the PCB sections 250C. The PCB sections 250D comprise a fourth data stripe 140D including a plurality of emitters 110. It is not necessary to include encoder sensors 134A, 134B on the PCB sections 250B, 250C, 250D because the rotary encoder information is provided by the PCB sections 250A. The PCB sections 250B, 250C, 250D may be referred to herein as secondary transmission PCBs.

In an embodiment, as illustrated in FIG. 8A, the slip ring transmitter 202 may include one or more additional data stripes 140 on each PCB section 250. In an embodiment, the PCB sections 250A, 250B, 250C, 250D are generally two inches wide. The PCB sections 250A include a fifth data stripe 140E. The PCB sections 250B include a sixth data stripe 140F. The PCB sections 250C include a seventh data stripe 140G. The PCB sections 250D include an eighth data stripe 140H. The slip ring 200 may further include a complex programmable logic device (CPLD) 252 located on one of the PCB sections 250A, 250B, 250C, 250D on a side opposite the plurality of emitters 110. In an embodiment, "light block" walls are included with the slip ring transmitter 202. By utilizing "light block" walls and/or spectral light diversity (e.g., different light spectrum per data stripe 140) and appropriate filters on the receivers 114), the data stripes 140 may be positioned side-by-side.

Increasing the total number of PCB sections 250A, 250B, 250C, 250D reduces the data transfer rate of a data channel 140 corresponding to the PCB section 250A, 250B, 250C, 250D. Increasing the total number of PCB sections 250A, 250B, 250C, 250D requires more data channels 140 to feed the total number of PCB sections 250A, 250B, 250C, 250D. Reducing the total number of PCB sections 250A, 250B, 250C, 250D increases the data transfer rate of each PCB section 250A, 250B, 250C, 250D. For example, if there is a single ring of PCB sections 250A covering the slip ring 200, then there is one data channel 140A required to feed the slip ring 200. However, in this embodiment, the data transfer rate will be equivalent to the incoming data transfer rate. For example, the data transfer rate may be a function of the transmitter 110 switch times.

In an embodiment, the slip ring 200 conveys data streams to individual PCB sections 250A, 250B, 250C, 250D through each PCB section. For example, if a pass-through scheme is utilized, a waterfall technique may be employed. In this example, the serial data comes-in through connector pins 1 and 2 of the 1st PCB section 250A, but passes-through and exits through pins 3 and 4 on the other side of the same PCB section 250A. In this embodiment, each PCB section 250A, 250B, 250C, 250D includes eight data streams, so that pins 1, 2; 3, 4; 5, 6; 7, 8; 9, 10; 11, 12; and 13, 14 all "pass-through," exiting the PCB sections 250A, 250B, 250C, 250D on the other side, one pin set down. As such, the data received on pins 15, 16 are utilized by that particular PCB section 250A, 250B, 250C, 250D. The CPLD 252 (i.e., data configurator) drives eight data streams (i.e., channels) on the clockwise (CW) side and eight data streams (i.e., channels) on the counter-clockwise (CCW) side of the slip ring 200. In this embodiment, the data transfer rate to each segment PCB section 250A, 250B, 250C, 250D is approximately 1/16th the incoming data transfer rate to the CPLD 252. In an example embodiment, the slip ring 200 may be utilized in bi-directional data transmission applications, wherein a plurality of LEDs 110 are utilized in transmission and a plurality of LEDs 110 are utilized as receivers.

In an example embodiment, the slip ring 200 includes a slip ring transmitter 202 having an outer-diameter of 5.5 ft. and a single data stripe 140A across sixteen PCB sections 250A. The data stripe 140A has a diameter of 5 ft and a circumference of 15.7 ft. For example, the PCB sections 250A of the slip ring transmitter 202 are two-inches wide. In an example embodiment, the data stripe 140A includes two-thousand-five-hundred-sixty transmitters 110, with one-hundred-sixty transmitters 110 per PCB section 250A. This embodiment of the slip ring 200 yields approximately 20 Gbps per two-inch PCB section 250A. Sixteen PCB sections 250A are replicated around the circumference of the slip ring transmitter 202, each PCB section 250A transferring forty data channels 126 (e.g., 32-data channels, 7-Forward Error Correction (FEC) channels, and 1-spare channel). For example, each data channel operates at forty Mbps with a twenty Mhz transmitter/receiver switch frequency yielding one-thousand-two-hundred-eighty Mbps per PCB section 250A. In an example embodiment, if a transmitter 110 or a receiver 114 fails, data transmission can be switched from the affected channel to a spare (e.g., unutilized) channel. The slip ring 200 includes an aggregate of five-hundred and twelve data channels (i.e., 16-PCB sections 250A*32-data channels) around the circumference of the slip ring 200 (the slip ring 200 includes six-hundred and forty channels if the FEC channels are counted). In an alternate embodiment, the slip ring transmitter 202 includes ten-inch wide PCB sections 250A having additional data stripes 140 (e.g., a total of five data stripes 140) for an aggregate data transfer rate of approximately 102 Gbps, including FEC.

Error Correction and Bit Error Rate

The slip ring 100, 200 provides an aggregate bandwidth capability that exceeds conventional data input stream rates. The slip ring 100, 200 thereby provides bandwidth for slip ring-internal error detection and correction schemes such as Forward Error Correction (FEC). FEC monitors slip ring 100, 200 system health. In an example embodiment, a run-length encoding FEC includes 32 bit single/double bit detect, and, optional, single bit correct. With FEC included in the slip ring 100, 200 design, data transfer performance is reported in terms of Bit-Error Rate (BER) while running applications exposed to in-situation electrical noise, vibrational, and thermal environments. Additionally, the slip ring 100, 200 may include additional circuitry to determine service identification of failures due to wear-out or mechanical damage to the non-rotating part 112 or the rotating part 102.

Another advantage of the slip ring 100, 200 is that the continuous transfer of data between the plurality of emitters 110 and the plurality of receivers 114 allows for, and takes into consideration, radial and axial runouts. Radial and axial runout are typical problems for large slip rings, thus having runout restrictions in the 1 mm range. The slip ring 100, 200 may allow radial and axial runouts in the range of 4-5 mm.

Traditional slip ring designs may not comply with new emerging standards and regulations for electromagnetic compatibility (EMC). For example, industry regulations include IEC60601-1-2 Edition 4. Further examples of tests that existing slip ring designs will have difficulty passing include Radiated Immunity at 9-28V/m at 385-6000 Mhz (3V/m); Electrostatic Discharge (ESD) at 15 kV air discharge (8 kV air discharge), and Magnetic Field Immunity (MFI) at 30 A/m (3 A/m). Advantageously, the slip ring 100, 200 is capable of passing all of the above-mentioned requirements and tests with an improved immunity as a result of FEC capability and the ability to use low cost RF-immune light sources for switching, while providing a high-bandwidth solution.

One or more features of the embodiments described herein may be combined to create additional embodiments which are not depicted. It should be appreciated that certain features of the slip ring 100, 200 which are, for clarity, described in the context of separate embodiments, may also be provided in combination in a single embodiment. Conversely, various features of the slip ring 100, 200, which are, for brevity, described in the context of a single embodiment, may also be provided separately or in any suitable combination. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A non-contacting rotary joint for transmitting and receiving electrical signals, comprising:

a transmitter having a plurality of emitters positioned in a substantially annular pattern, wherein said plurality of emitters are operable to transmit a signal;

a receiver located a distance from said transmitter, wherein said receiver includes a plurality of cells operable to receive said signal across a non-contacting interface; and a signal source in communication with said transmitter;

wherein said plurality of emitters form a plurality of data channels less than said plurality of emitters;

wherein each of said plurality of data channels comprises four emitters;

wherein each of said plurality of data channels comprises two active emitters and two inactive emitters; and wherein one inactive emitter is located on either side of two active emitters in each of said plurality of data channels.

2. The non-contacting rotary joint for transmitting and receiving electrical signals according to claim 1, wherein said plurality of emitters are operable to emit one or more wavelengths of light.

3. The non-contacting rotary joint for transmitting and receiving electrical signals according to claim 1, wherein said transmitter further comprises:

an encoder position sensor ring;

a rotating register; and a stationary register, wherein bits from said signal source are parallel-loaded into said rotating register and clocked via a signal from said encoder position sensor ring at said stationary register;

wherein said active emitters are shifted one position with rotation of said transmitter or receiver with every interval of said stationary register.

4. The non-contacting rotary joint for transmitting and receiving electrical signals according to claim 1, wherein each of said plurality of data channels is operable to transmit data simultaneously.

5. The non-contacting rotary joint for transmitting and receiving electrical signals according to claim 1, wherein each of said plurality of data channels is operable to transmit data with five millimeters of radial runout or axial runout between said transmitter and said receiver.

6. The non-contacting rotary joint for transmitting and receiving electrical signals according to claim 1, further comprising an integrated circuit operable to control said plurality of data channels, wherein said integrated circuit comprises one or more Field-Programmable Gate Arrays operable to manage data transfer between said plurality of emitters and receiver cells.

7. The non-contacting rotary joint for transmitting and receiving electrical signals according to claim 1, wherein said plurality of data channels are formed in multiple concentric data channel stripes.

8. The non-contacting rotary joint for transmitting and receiving electrical signals according to claim 1, wherein said plurality of emitters are one of light emitting diode emitters, capacitive emitters, inductive emitters, and radio frequency emitters.

9. The non-contacting rotary joint for transmitting and receiving electrical signals according to claim 1, wherein said plurality of data channels comprise one or more Forward Error Correction channels operable to monitor system performance.

10. The non-contacting rotary joint for transmitting and receiving electrical signals according to claim 1, wherein said transmitter comprises discrete Printed Circuit Board (PCB) sections.

11. The non-contacting rotary joint for transmitting and receiving electrical signals according to claim 10, wherein a mounting space of 2 mm or less is located between said transmitter PCB sections.

12. A non-contacting rotary joint for transmitting and receiving electrical signals, comprising:

a transmitter having a plurality of emitters positioned in a substantially annular pattern, wherein said plurality of emitters are operable to transmit a signal;

a receiver located a distance from said transmitter, wherein said receiver includes a plurality of cells operable to receive said signal across a non-contacting interface; and a signal source in communication with said transmitter;

wherein said plurality of emitters form a plurality of data channels less than said plurality of emitters;

wherein said plurality of emitters are operable to emit one or more wavelengths of light; and wherein said emitters are operable to emit light in at least a first wavelength range and a second wavelength range, and wherein spectral channel differentiation is operable in uni-directional and bi-directional data transmission.

13. A non-contacting rotary joint for transmitting and receiving electrical signals, comprising:

a transmitter having a plurality of emitters positioned in a substantially annular pattern, wherein said plurality of emitters are operable to transmit a signal;

a receiver located a distance from said transmitter, wherein said receiver includes a plurality of cells operable to receive said signal across a non-contacting interface; and a signal source in communication with said transmitter;

wherein said plurality of emitters form a plurality of data channels less than said plurality of emitters;

wherein said transmitter comprises discrete Printed Circuit Board (PCB) sections; and wherein said transmitter comprises an embedded encoder position sensor ring, and said encoder position sensor ring is sectioned with said discrete PCB sections of said transmitter.

14. A non-contacting rotary joint for transmitting and receiving electrical signals, comprising:

a transmitter having a plurality of emitters positioned in a substantially annular pattern, wherein said plurality of emitters are operable to transmit a signal;

a receiver located a distance from said transmitter, wherein said receiver includes a plurality of cells operable to receive said signal across a non-contacting interface; and a signal source in communication with said transmitter;

wherein said plurality of emitters form a plurality of data channels less than said plurality of emitters;

wherein said transmitter comprises discrete Printed Circuit Board (PCB) sections; and wherein said transmitter comprises two or more concentric PCB sections, wherein a data stripe is located on each concentric PCB section, and said emitters are in electrical connection with respective data stripes.

* * * * *